United States Patent
Lee et al.

(10) Patent No.: US 8,059,703 B2
(45) Date of Patent: Nov. 15, 2011

(54) SYSTEM AND METHOD FOR DETERMINING A SUITABLE IMPEDANCE FOR A MODEM

(75) Inventors: Che-Ming Lee, Taipei Hsien (TW); Yew-Min Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 543 days.

(21) Appl. No.: 12/257,370

(22) Filed: Oct. 23, 2008

(65) Prior Publication Data

US 2009/0310660 A1    Dec. 17, 2009

(30) Foreign Application Priority Data

Jun. 13, 2008    (CN) .......................... 2008 1 0302146

(51) Int. Cl.
*H04B 1/38*    (2006.01)

(52) U.S. Cl. ........ 375/222; 375/219; 375/220; 375/221; 375/223; 375/257; 379/394; 379/395; 379/398

(58) Field of Classification Search .................. 375/136, 375/138, 145, 219, 220, 222, 223, 242, 259, 375/295, 299, 316; 379/394–398
See application file for complete search history.

(56) References Cited

U.S. PATENT DOCUMENTS

| | | | |
|---|---|---|---|
| 6,192,109 B1 * | 2/2001 | Amrany et al. | 379/30 |
| 6,724,890 B1 * | 4/2004 | Bareis | 379/394 |
| 7,227,959 B2 * | 6/2007 | Abraham | 381/83 |
| 7,558,385 B2 * | 7/2009 | Rayher et al. | 379/394 |
| 2005/0232300 A1 * | 10/2005 | Stiscia et al. | 370/463 |
| 2007/0190952 A1 * | 8/2007 | Waheed et al. | 455/114.3 |

* cited by examiner

*Primary Examiner* — Shuwang Liu
*Assistant Examiner* — Hirdepal Singh
(74) *Attorney, Agent, or Firm* — Altis Law Group, Inc.

(57) ABSTRACT

A system includes a plurality of modules which are configured for determining a suitable impedance for a modem. The plurality of modules send signals with a plurality of signal frequencies to a telephone and receive feedback signals from the telephone under each of a plurality of impedances of the modem, compute a total decibel value of the feedbacks under each impedance, and determine a suitable impedance according to a minimum total decibel value from the plurality of total decibel values.

15 Claims, 2 Drawing Sheets

US 8,059,703 B2

SYSTEM AND METHOD FOR DETERMINING A SUITABLE IMPEDANCE FOR A MODEM

BACKGROUND

1. Technical Field

Embodiments of the present disclosure generally relate to modems, and more particularly, to a system and method for determining a suitable impedance for a modem.

2. Description of Related Art

Voice over Internet protocol (VoIP) is an important technology in the telephone network. VoIP can transform analog signals into digital signals, pack the digital signals as a data packet, transfer the data packet to a terminal via the telephone network, and then transform the digital signals into the analog signals in the terminal.

Modems and telephones are necessary and key components in the VoIP. When a modem matches with a telephone, echoes during communication can be decreased, and thus the communication quality can increase.

Generally, if an impedance of the modem is equal to an impedance of the telephone, the modem and the telephone can be best matched. Conventionally, determining a suitable impedance for the modem is done manually. The manual work is time-waste, and the determined suitable impedance for the modem may not always match with the impedance of the telephone.

What is needed, therefore, is a system and a method for determining a suitable impedance for a modem, which can determine a suitable impedance of the modem effectively and accurately.

SUMMARY

A system for determining a suitable impedance for a modem is provided. The system includes a selecting module, a setting module, an adjusting module, a sending module, a receiving module, a computing module, an impedance determining module, and at least one processor. The selecting module is configured for selecting an impedance of the modem. The setting module is configured for setting a signal frequency of the modem. The adjusting module is configured for adjusting the signal frequency by an adjustment frequency each time until the signal frequency reaches a predetermined frequency. The sending module is configured for sending signals with the signal frequencies to a telephone. The receiving module is configured for receiving feedback signals from the telephone. The computing module is configured for computing a decibel value of each of the feedback signals and further computing a total decibel value of the feedback signals under each selected impedance. The impedance determining module is configured for determining a suitable impedance from the impedances of the modem according to a minimum total decibel value when all the impedances of the modem have been selected. The at least one processor is for executing the selecting module, the setting module, the adjusting module, the sending module, the receiving module, the computing module, and the impedance determining module.

Other advantages and novel features of the present invention will become more apparent from the following detailed description of preferred embodiment when taken in conjunction with the accompanying drawings.

DETAILED DESCRIPTION OF CERTAIN INVENTIVE EMBODIMENTS

Figure 1:
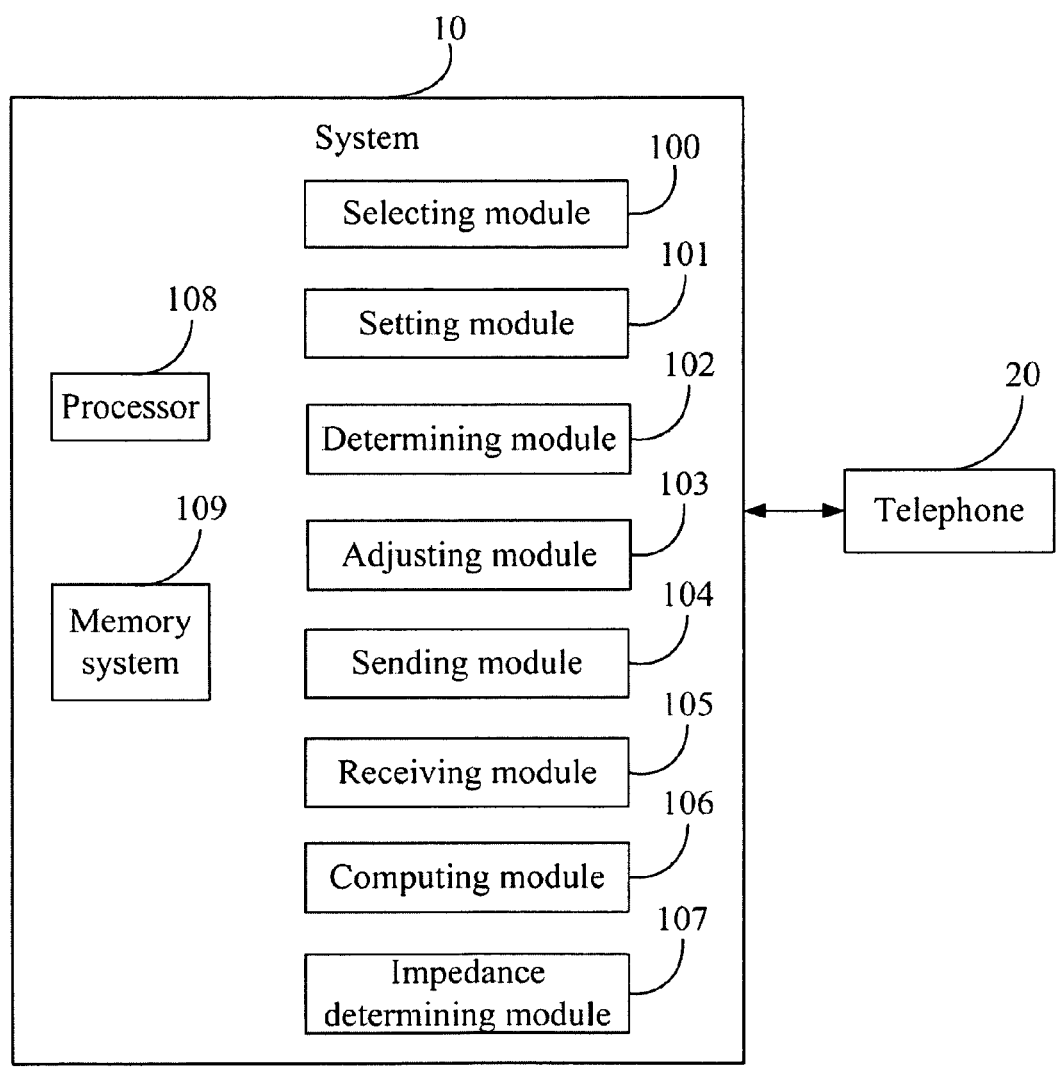
FIG. 1 is a block diagram of one embodiment of a system for determining a suitable impedance for a modem.

FIG. 1 is a block diagram of one embodiment of a system 10 for determining a suitable impedance for a modem. In one embodiment, the system 10 is installed in the modem, and includes a selecting module 100, a setting module 101, a determining module 102, an adjusting module 103, a sending module 104, a receiving module 105, a computing module 106, and an impedance determining module 107. The modules 100, 101, 102, 103, 104, 105, 106, and 107 recited above perform one or more tasks for determining a suitable impedance for the modem. It may be understood that, one or more specialized or general purpose processors, such as a processor 108, in the system 10 may be used to execute the function modules 100, 101, 102, 103, 104, 105, 106, and 107. It may be further understood that, one or more memory systems, such as a memory system 109, may be installed in the system 10 for storing data needed or generated when determining a suitable impedance for the modem.

In one embodiment, one or more telephones, such as a telephone 20, is connected to the system 10. The system 10 can receive analog signals from the telephone 20, or transform digital signals into analog signals, and send the analog signals to the telephone 20.

The selecting module 100 is configured for selecting an impedance of the modem. It may be understood that, the modem may have a plurality of impedances. The selecting module 100 selects one impedance from the plurality of impedances at one time.

The setting module 101 is configured for setting an initial signal frequency of the modem, such as 1 KHz, for example. In one embodiment, the signal frequency is a tone frequency.

The determining module 102 is configured for determining if a current signal frequency of the modem equals a predetermined frequency, such as 20 KHz, for example.

The adjusting module 103 is configured for adjusting the current signal frequency by an adjustment frequency, such as 1 KHz in increments, until the determining module 102 determines that the current signal frequency equals the predetermined frequency, such as 20 KHz.

The sending module 104 is configured for sending signals with the signal frequencies, such as sending a signal with the initial signal frequency, or sending a signal with the current signal frequency, to the telephone 20. In one embodiment, the signals are tones.

The receiving module 105 is configured for receiving feedback signals from the telephone 20. In one embodiment, the feedback signals are echoes.

The computing module 106 is configured for computing a decibel value of each of the feedback signals, and further computing a total decibel value of the feedback signals under each selected impedance. The decibel value of each of the feedback signals can be computed by using the fast Fourier transform (FFT) method in one exemplary embodiment. The total decibel value of the feedback signals under each selected impedance may be stored into the memory system 109.

The impedance determining module 107 is configured for determining a suitable impedance from the plurality of impedances of the modem according to a minimum total decibel value, when all impedances of the modem have been selected by the selecting module 100.

Figure 2:
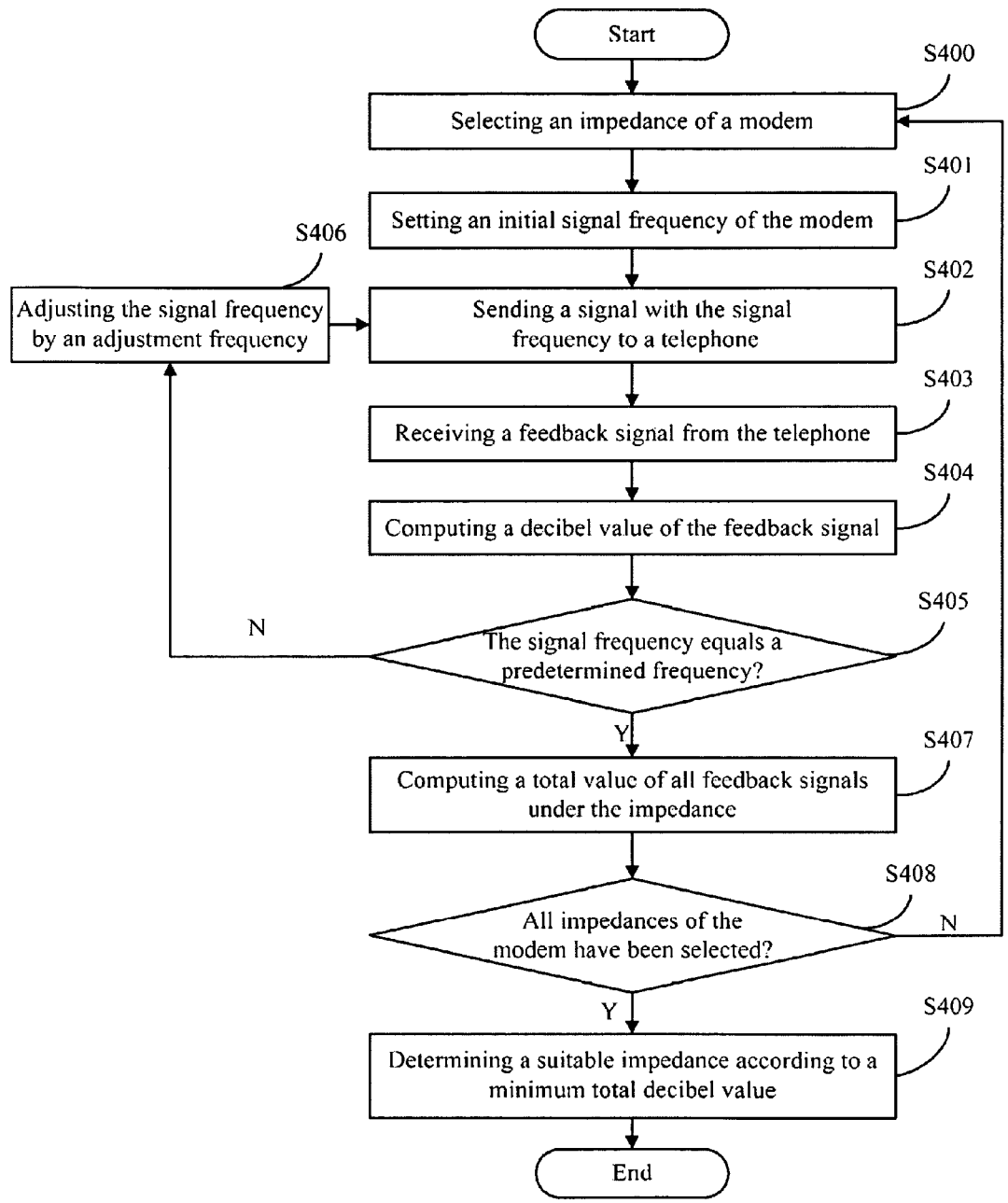
FIG. 2 is a flowchart illustrating one embodiment of a method for determining a suitable impedance for a modem.

FIG. 2 is a flowchart illustrating one embodiment of a method for determining a suitable impedance for a modem.

Depending on the embodiment, additional blocks in the flow of FIG. 2 may be added, others removed, and the ordering of the blocks may be changed.

In block S400, the selecting module 100 selects an impedance of the modem. As mentioned above, the modem may have a plurality of impedances. In the block S400, the selecting module 100 selects one impedance from the plurality of impedances.

In block S401, the setting module 101 sets an initial signal frequency of the modem, such as 1 KHz, for example. As mentioned above, the signal frequency is a tone frequency.

In block S402, the sending module 104 sends a signal with the signal frequency to the telephone 20. It is noted that when it is the first time to send a signal to the telephone 20, the signal frequency is the initial signal frequency, e.g., 1 KHz. As mentioned above, the signal is a tone.

In block S403, the receiving module 105 receives a feedback signal from the telephone 20. As mentioned above, the feedback signal is an echo.

In block S404, the computing module 106 computes a decibel value of the feedback signal. As mentioned above, computing the decibel value of the feedback signal may use the FFT method.

In block S405, the determining module 102 determines if a current signal frequency of the modem equals a predetermined frequency, such as 20 KHz. If the current signal frequency of the modem does not equal the predetermined frequency, the flow moves to block S406. Otherwise, if the current signal frequency of the modem equals the predetermined frequency, the flow moves to block S407.

In block S406, the adjusting module 103 adjusts the current signal frequency by an adjustment frequency, then the flow returns to block S402. In one embodiment, the adjustment frequency is 1 KHz.

In block S407, the computing module 106 computes a total decibel value of all feedback signals under the selected impedance, and stores the total decibel value into the memory system 109.

In block S408, the determining module 102 determines that if all impedances of the modem have been selected. If there is any impedance of the modem has not been selected, the flows returns to block S400. If all impedances of the modem have been selected, and a total decibel values of feedback signals under each of the plurality of impedances has been determined, the flow moves to block S409.

In block S409, the impedance determining module 107 determines a suitable impedance from the impedances of the modem according to a minimum total decibel value from the plurality of total decibel values.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for determining a suitable impedance for a modem, the system comprising:
    a selecting module configured for selecting an impedance of the modem;
    a setting module configured for setting a signal frequency of the modem;
    an adjusting module configured for adjusting the signal frequency by an adjustment frequency each time until the signal frequency reaches a predetermined frequency;
    a sending module configured for sending signals with the signal frequencies to a telephone;
    a receiving module configured for receiving feedback signals from the telephone;
    a computing module configured for computing a decibel value of each of the feedback signals and further computing a total decibel value of the feedback signals under each selected impedance;
    an impedance determining module configured for determining a suitable impedance from the impedances of the modem according to a minimum total decibel value when all the impedances of the modem have been selected; and
    at least one processor for executing the selecting module, the setting module, the adjusting module, the sending module, the receiving module, the computing module, and the impedance determining module.

2. The system as described in claim 1, wherein the computing module is further configured for storing the total decibel value of the feedback signals into a memory system.

3. The system as described in claim 1, wherein the signals are tones and the feedback signals are echoes.

4. The system as described in claim 1, wherein the signal frequency is about 1 KHz, the adjustment frequency is about 1 KHz, and the predetermined frequency is about 20 KHz.

5. The system as described in claim 1, wherein computing a decibel value of each of the feedback signals is by using a method of fast Fourier transform (FFT).

6. A method of determining a suitable impedance for a modem, the method comprising:
    (a) selecting an impedance of the modem;
    (b) setting a signal frequency of the modem;
    (c) sending a signal with the signal frequency to a telephone;
    (d) receiving a feedback signal from the telephone;
    (e) computing a decibel value of the feedback signal;
    (f) adjusting the signal frequency by an adjustment frequency each time upon the condition that the signal frequency has not reached a predetermined frequency, and repeating steps (c) to (e);
    (g) computing a total decibel value of all feedback signals under the selected impedance upon the condition that the signal frequency has reached the predetermined frequency;
    (h) repeating steps from (a) to (g) for obtaining a plurality of total decibel values of feedback signals until all impedances of the modem have been selected; and
    (i) determining a suitable impedance from the impedances of the modem according to a minimum total decibel value from the plurality of total decibel values.

7. The method as described in claim 6, wherein step (g) further comprises: storing the total decibel value of the feedback signals into a memory system.

8. The method as described in claim 6, wherein the signals are tones and the feedback signals are echoes.

9. The method as described in claim 6, wherein the signal frequency is about 1 KHz, the adjustment frequency is about 1 KHz, and the predetermined frequency is about 20 KHz.

10. The method as described in claim 6, wherein computing a decibel value of the feedback signal is by using a method of fast Fourier transform (FFT).

11. A non-transitory storage medium having stored thereon instructions that, when executed by a processor, causing the processor to perform a method of determining a suitable impedance for a modem, the method comprising:
    (a) selecting an impedance of the modem;
    (b) setting a signal frequency of the modem;
    (c) sending a signal with the signal frequency to a telephone;

(d) receiving a feedback signal from the telephone;
(e) computing a decibel value of the feedback signal;
(f) adjusting the signal frequency by an adjustment frequency each time upon the condition that the signal frequency has not reached a predetermined frequency, and repeating steps from (c) to (e);
(g) computing a total decibel value of all feedback signals under the selected impedance upon the condition that the signal frequency has reached the predetermined frequency;
(h) repeating steps from (a) to (g) for obtaining a plurality of total decibel values of feedback signals until all impedances of the modem have been selected; and
(i) determining a suitable impedance from the impedances of the modem according to a minimum total decibel value from the plurality of total decibel values.

12. The non-transitory storage medium as described in claim 11, wherein step (g) further comprises:
storing the total decibel value of the feedback signals into a memory system.

13. The non-transitory storage medium as described in claim 11, wherein the signals are tones and the feedback signals are echoes.

14. The non-transitory storage medium as described in claim 11, wherein the signal frequency is about 1 KHz, the adjustment frequency is about 1 KHz, and the predetermined frequency is about 20 KHz.

15. The non-transitory medium as described in claim 11, wherein computing a decibel value of the feedback signal is by using a method of fast Fourier transform (FFT).

* * * * *